Jan. 29, 1952 J. WIEGANT 2,583,917
ATTACHMENT FOR LATHES
Filed April 17, 1950 2 SHEETS—SHEET 1
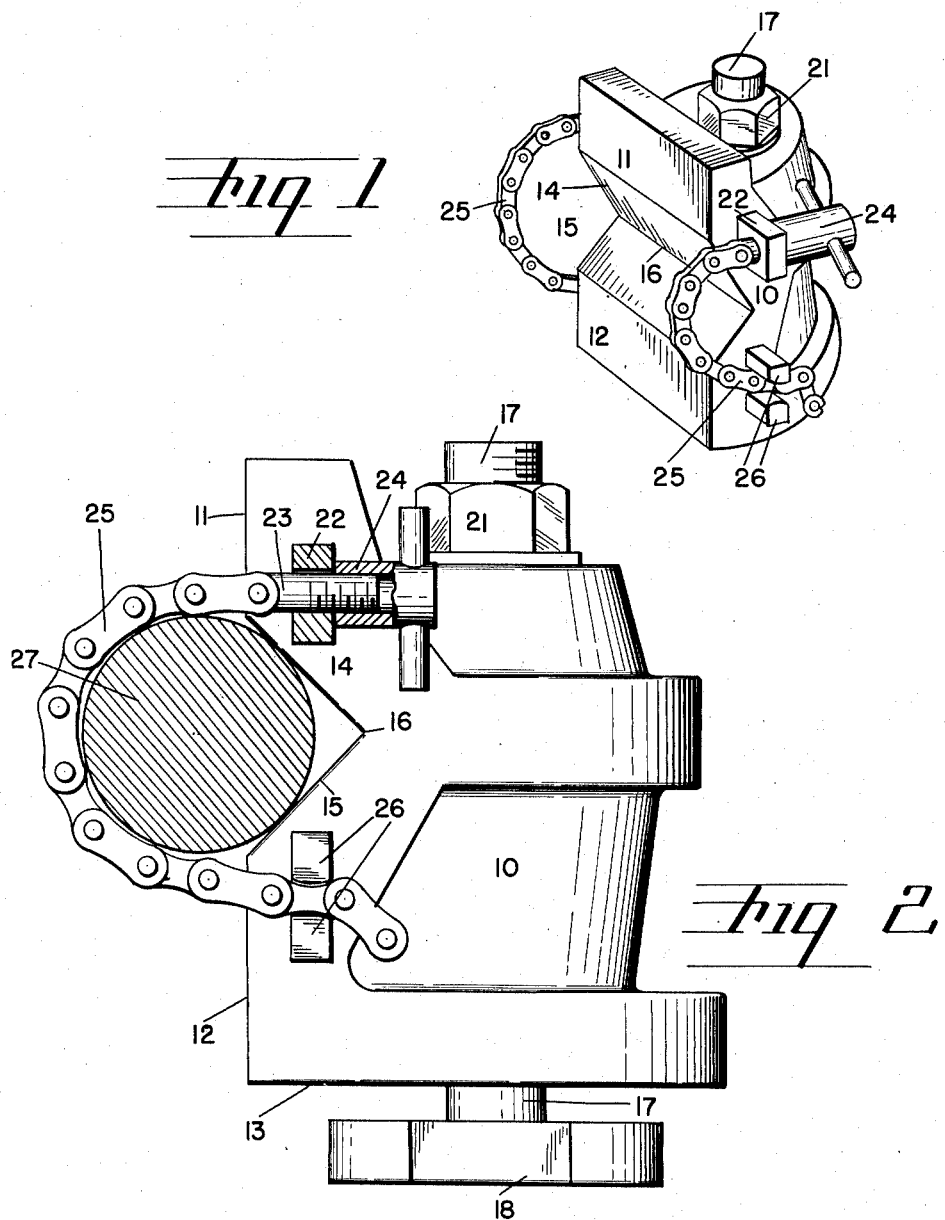
INVENTOR.
JOHN WIEGANT
BY
*F. R. Geisler*
ATTORNEY

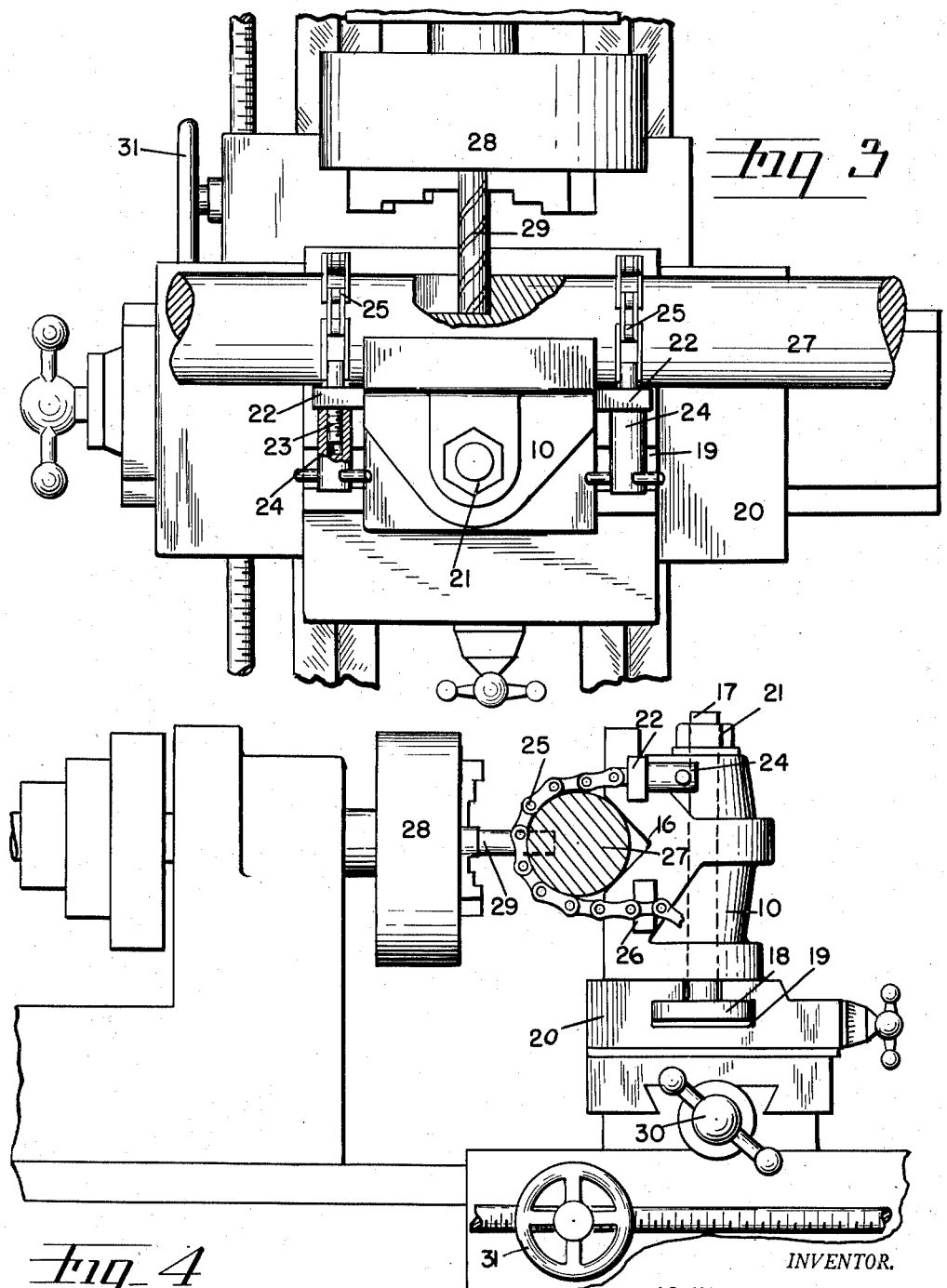

Patented Jan. 29, 1952

2,583,917

UNITED STATES PATENT OFFICE 2,583,917

ATTACHMENT FOR LATHES

John Wiegant, Depoe Bay, Oreg.

Application April 17, 1950, Serial No. 156,307

1 Claim. (Cl. 90—59)

This invention relates in general to attachments for ordinary lathes, and, more specifically, to an attachment adapted to enable a milling operation, such as the cutting of a keyway in a shaft, to be performed on a lathe.

A particular object of the invention is to provide a lathe attachment by the aid of which a milling operation can be performed on a lathe with the use of a common end mill cutter.

A further object of the invention is to provide an attachment for use on a lathe which will enable keyways to be cut to any size, depth and length in shafts of a wide range of sizes merely by the use of common end mill cutters.

An additional object of this invention is to provide an attachment serving the purpose above indicated for ordinary lathes, which attachment will be simple and practical in construction, relatively inexpensive to manufacture, and easy to use; thereby enabling the owner of an ordinary lathe to perform such operations as cutting keyways in shafts, which would otherwise be required to be done on a separate milling machine.

The manner in which these objects are attained with my special attachment for lathes will be readily understood from the following brief description of the attachment, in which description reference is to be made to the accompanying drawings.

In the drawings:

Fig. 1 is a perspective view of my lathe attachment by itself;

Fig. 2 is a side elevation of the same, drawn to a larger scale and illustrating how a shaft is held by the attachment;

Fig. 3 is a fragmentary plan view of a lathe with my attachment mounted on the lathe and illustrating the same in use in the cutting of a keyway in a shaft by an ordinary end mill cutter; and Fig. 4 is a corresponding side elevation, taken from the left in Fig. 3.

The main body member of my lathe attachment comprises a cast block 10 preferably shaped substantially as shown in Figs. 1 and 2. This block has a front face having separated upper and lower sections 11 and 12 which lie in the same plane perpendicular to the bottom face 13 of the block. A V-shaped groove, the faces of which preferably form a dihedral angle of 90°, extends horizontally across the front face of the block. The two faces 14 and 15 of the groove make equal angles (thus preferably angles of 225°) with the adjacent front face sections 11 and 12 respectively, and the vertex line 16 of the groove is horizontal and is parallel to the plane of the front face sections 11 and 12 as well as being parallel to the bottom face 13.

A hole extends vertically through the block 10 to accommodate a bolt 17. The bottom end of the bolt is enlarged and formed into a clamping plate 18 adapted to be inserted in either end of the channel 19 (Figs. 3 and 4) extending transversely across the lathe carriage 20, which channel is customarily used for the tool post of the lathe, and to be adjustably positioned therein. A nut 21, at the top of the bolt 17, enables the block 10 to be secured firmly on the lathe carriage 20 by causing a clamping action to be exerted between the nut and the plate 18 on the block 10 and interposed portion of the top of the lathe carriage.

A pair of ears 22 extend on opposite sides respectively from the upper portion of the block 10. A threaded stub shaft 23 (Fig. 2) extends through a channel in each of these ears 22 and carries a tightening nut 24 placed against the rear face of each ear. The forward end of each stub shaft 23, beyond the front face of each ear 22, is connected to a sprocket chain 25. A pair of spaced fingers 26 are mounted on each side of the lower portion of the block 10. The spacing between each pair of fingers 26 is such as to enable a link of one of the sprocket chains 24, when inserted between the fingers, to be held firmly against any pull on the chain, as will be apparent from Figs. 1 and 2.

The function of the sprocket chains 25 and their mountings is to enable a shaft, such as the shaft 27 of Figs. 2, 3 and 4, to be firmly held against the front face of the block 10 and in the horizontal transverse groove of the block. The two chains at opposite sides of the block 10 can have their free ends adjusted in their respective pairs of fingers 26, so as to provide chain loops of the desired size to fit around the shaft to be held in place, such as the shaft 27, whereupon the final tightening of the chains, done by means of the tightening nuts 24, will cause the shaft to be very firmly held in place in the groove on the front face of the block 10. Thus shafts of a wide range of diameters may be secured to the block 10 in this manner, and, when the holding chains 25 are properly tightened, the shaft will then always be held with its axis exactly in the same horizontal plane as the vertex line 16 of the transverse V-shaped groove of the block 10.

The distance of the vertex line 16 from the bottom face 13 of the block 10, and thus the distance of the vertex of the groove from the top of the lathe carriage 20 (Fig. 4), is such that this vertex line 16 will be exactly in the same horizontal plane as the axis of the rotating head and chuck 28 of the lathe and consequently also in the same horizontal plane as the axis of any cutting tool, such as the end mill cutter 29, mounted in the lathe chuck.

When my attachment is to be used, for example in the cutting of a keyway in a shaft, the attachment is mounted on the lathe carriage 20 in place of the usual tool post and is secured to the carriage by the tightening of the nut 21. The carriage 20, as is customary in all ordinary lathes, can be moved transversely on the lathe, thus by means of an adjustable positioning screw operated by the hand control 30 (Figs. 3 and 4), or the entire carriage assembly can be moved longitudinally with respect to the lathe by operation of the adjusting wheel 31 and the carriage-moving elements associated therewith.

When the block 10 is secured on the lathe carriage 20 the shaft on which the work is to be done, such as the shaft 27 shown in the drawings, is then firmly secured to the block 10 by means of the chains 25 and the tightening nuts 24. The end mill cutter 29 of the proper diameter corresponding to the desired width of the keyway or slot to be cut in the shaft, is secured in the chuck of the lathe.

With the shaft 27 mounted in position on the block 10 as desired, and the end mill cutter 29 rotating, the carriage 20, with the block 10 and shaft thereon, is moved forwardly by means of the manual control 31 until the end mill cutter engages the shaft and cuts a hole to the desired depth for the slot or keyway. Then further forward movement of the carriage is discontinued and the carriage is next moved laterally or transversely by means of the control 30, thus causing the shaft 27 to be moved along in an axial direction without changing its distance from the cutting tool, with the result that the end mill cutter 29 will cut the longitudinal slot or keyway in the shaft as desired. Since the axis of the shaft 27 will always be in the same horizontal plane as the axis of the lathe chuck and cutting tool, the resulting slot in the shaft will always extend parallel to the shaft axis.

Thus a slot of any depth and length and of any width, depending upon the cutting tool selected, can be cut in any shaft on any ordinary lathe with the use of my attachment. The requirement for a separate milling machine for the performance of such work is eliminated, and no tool beyond the ordinary end mill cutter is required. My attachment can quickly and easily be set in place on the lathe carriage and subsequently removed therefrom, in place of the ordinary tool post. The shaft, or other object on which the work is to be done, is quickly and easily secured in proper position on the lathe attachment and a minimum amount of adjustment is required.

Minor modifications could of course be made in my lathe attachment without departing from the principle of my invention, but the particular manner of constructing my attachment which I have illustrated and described I consider to be preferable.

I claim:

A lathe attachment of the character described, adapted to be mounted on a lathe carriage in place of the tool rest, said attachment including a body block having a flat bottom face and a front face perpendicular to said bottom face, said bottom face adapted to rest on the top of said carriage, a clamping bolt extending centrally downwardly through said block, a clamping plate on the bottom end of said bolt and spaced below said bottom face of said block for engaging the tool-rest-mounting groove in said carriage, a clamping nut on the upper end of said bolt on top of said block, a V-shaped groove extending across said front face of said block, the walls of said groove forming equal angle with the top and bottom portions of said front face respectively, the vertex line of said groove extending parallel to said bottom face of said block and located at such distance from said bottom face that when said block is mounted on said carriage said vertex line will lie in the same horizontal plane as the axis of rotation of the lathe tool, a pair of spaced fingers extending laterally from each side of said block below said groove, a pair of sprocket chains having bottom end portions removably engaged by said pairs of fingers respectively, an ear extending from each side of said block above said groove, a channel extending through each ear, a threaded stud shaft attached to the upper end of each chain, said stub shafts extending through said ear channels respectively, and a tightening nut on each stub shaft, whereby said chains can hold the work clamped in said groove on said attachment and said block will hold the work in desired position on said carriage and lathe.

JOHN WIEGANT.

REFERENCES CITED

The following references are of record in the file of this patent:

UNITED STATES PATENTS

| Number | Name | Date |
|---|---|---|
| 507,047 | Strickland | Oct. 17, 1893 |
| 1,216,600 | Paschall | Feb. 20, 1917 |
| 1,410,553 | Cox | Mar. 28, 1922 |
| 2,203,162 | Lee | June 4, 1940 |
| 2,450,967 | Keiser | Oct. 12, 1948 |

FOREIGN PATENTS

| Number | Country | Date |
|---|---|---|
| 23,912 | Denmark | Dec. 11, 1918 |